US006316741B1

(12) United States Patent
Fitzgibbons et al.

(10) Patent No.: US 6,316,741 B1
(45) Date of Patent: Nov. 13, 2001

(54) OBJECT SORTATION FOR DELIVERY SEQUENCING

(75) Inventors: Patrick J. Fitzgibbons, Newark Valley; Bruce H. Hanson, Endicott, both of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/325,553

(22) Filed: Jun. 4, 1999

(51) Int. Cl.[7] ................................ B07C 5/342; G06F 7/08
(52) U.S. Cl. ........................... 209/584; 209/900; 700/224
(58) Field of Search .................................... 209/584, 900; 700/224

(56) References Cited

U.S. PATENT DOCUMENTS

| | | | | |
|---|---|---|---|---|
| 4,247,008 | * | 1/1981 | Dobbs | 209/584 |
| 5,009,321 | | 4/1991 | Keough . | |
| 5,042,667 | | 8/1991 | Keough . | |
| 5,287,271 | | 2/1994 | Rosenbaum . | |
| 5,311,597 | | 5/1994 | Rosenbaum . | |
| 5,330,174 | * | 7/1994 | Ricciardi | 271/297 |
| 5,353,938 | * | 10/1994 | LaGrange et al. | 209/584 |
| 5,363,971 | | 11/1994 | Weeks et al. . | |
| 5,377,120 | | 12/1994 | Humes et al. . | |
| 5,385,243 | * | 1/1995 | Jackson et al. | 209/584 |
| 5,419,457 | * | 5/1995 | Ross et al. | 209/584 |
| 5,429,249 | * | 7/1995 | Belec et al. | 209/584 |
| 5,538,140 | * | 7/1996 | Guenther et al. | 209/900 |
| 5,667,078 | | 9/1997 | Walach . | |
| 5,675,671 | * | 10/1997 | Hayduchok et al. | 382/296 |
| 5,749,473 | | 5/1998 | Yamashita et al. . | |
| 5,901,855 | * | 5/1999 | Uno et al. | 209/584 |
| 5,924,576 | * | 7/1999 | Steenge | 209/584 |

* cited by examiner

*Primary Examiner*—John M. Jillions
(74) *Attorney, Agent, or Firm*—McGuireWoods, LLP

(57) ABSTRACT

A sortation process provides high-speed sorting of randomly ordered articles into a desired order in a plurality of ordered bins or tubs such as standard USPS tubs in two passes, without additionally marking the articles in any way or requiring additional processes to do so. Optical character recognition or bar code reading performed on an image of the article provides a sequence number which is used to place the articles in respective bins or tubs during a first pass. The process then presents the content of the bins or tubs in order for a second pass during which they are placed in final desired order among a final ordered group of bins or tubs. During the first pass, sequence number information can be collected and used for error checking against the order of articles in each bin or tub during a second pass. The final output of the process provides the articles in standard (e.g. USPS) tubs face up and in delivery order.

20 Claims, 2 Drawing Sheets

OBJECT SORTATION FOR DELIVERY SEQUENCING

BACKGROUND OF THE INVENTION

1. Field of the Invention

The present invention generally relates to the sortation of articles into a plurality of groups, each in a desired sequence and, more particularly, to sorting of articles, such as postal flats, in accordance with intermediate or final destinations such as delivery points along each of a plurality of delivery routes for mail or other delivery services.

2. Description of the Prior Art

The pace of commerce and volume of written communications has increased annually for many years to the point that tens, if not hundreds, of millions of articles are sent from many locations to any of millions of delivery points daily. The articles will generally be in a random order when deposited with a carrier such as the United States Postal Service and then will be aggregated with articles from many other senders prior to being sorted for transportation to a regional facility in the general vicinity of the addressee, thence to a local office and finally to a carrier for delivery to a specified final delivery point.

The volume of articles handled by a given carrier has become quite large and the number of delivery points along each delivery route (as well as the number of routes provided) has increased with increases in the general population and improvements in level of delivery services. Accordingly, it is necessary that all phases of the sortation and processing of articles for delivery be carried out with increased accuracy and speed. For example, it is not possible to read addresses and manually sort all articles which may be deposited with a delivery service. For this reason, central facilities have employed a high degree of automation using bar code readers and/or character recognition to perform basic sorting of articles to be transported to defined geographic regions or to local offices within those regions. Further, a plurality of those geographical regions may be served by a single vehicle, such as an aircraft, along a route which is repeated daily.

The problem of handling large volumes of articles is more aggravated and less tractable at the level of carrier delivery routes. Carriers must traverse their assigned routes in the shortest possible time and the time available is not sufficient for verifying the address provided for each article in accordance with each of a large plurality of delivery points. By the same token, if a delivery of one or more articles is not made as the carrier visits each delivery point, no time is available to retrace a potentially large portion of a delivery route in order to make the delivery, and delivery must be postponed to the following day. If a delivery is erroneously made at a given delivery point, it may be several days before the recipient redeposits the article with the carrier and an additional period of time required for another, hopefully correct, delivery to be made. Further, the orientation of the articles in relation to the addresses placed thereon is an additional source of inconvenience to the carrier and errors in delivery.

Accordingly, it is seen that sortation of articles for delivery must be automated at virtually all levels of the delivery process. However, at the present time, only a single level of sorting is generally available in currently used processes and is only practical at major collection centers and distribution points. A multiple pass process is, however, disclosed in Keough, U.S. Pat. No. 5,009,321, but requires a first pass for addresses to be read by an optical character reader and labelling with a bar code label which is thereafter used for a multiple-pass sorting process; the first sorting pass separating the articles into bins and multiple further passes to reach a delivery sequence order. The bar-code labelling process and additional sorting steps required involves additional processing time and sorting machine overhead as well as additional operator involvement and defacement of the individual articles to reach the result of delivery order sequence.

Moreover, no automated facility is presently available which has the potential for improving accuracy and speed of delivery at the local carrier route level. Many delivery errors and many instances of inefficiency are occasioned by errors in the order in which articles or groups of articles are placed which requires additional perusal of the intended delivery address numerous times in the course of a correct delivery or the failure of a carrier to find all articles to be delivered to a given address at the time the carrier reaches that address.

Further, no known system presents the articles in a given orientation using standard (e.g. USPS) flats tubs with regard to an address affixed thereto as well as in order of delivery point at any level of the delivery process. Accordingly, the likelihood of sorting and/or delivery errors as well as handling time is increased.

In regard to the United States Postal Service (USPS) at the present time, a further problem is presented which may be shared by other delivery services in the near future. Specifically, the USPS has standardized the dimensions, weight and other characteristics of tubs made of wire-reinforced corrugated sheet plastic used to manually transport mail. These tubs have been manufactured in great numbers and are in widespread use throughout the United States. Standardization of such tubs, of course results in many efficiencies for packing and transporting mail items as well as providing convenience, such as effectively limiting the weight of articles which may be placed therein by imposing a limit on the volume thereof, to personnel who must manually carry them. However, for purposes of mechanically sorting mail and placing articles in delivery order, these tubs present several practical problems.

First, the tubs have a length and width that exceed the dimensions of the largest"flats" (e.g. large envelopes which exceed normal"letter" dimensions, generally between 6×9 inches and 12×18 inches) so that a flat cannot become wedged between all four sides of the tub from which it would be difficult to extract but can become displaced between a stack of flats and a side of the tub which both violates ordering of the flats and presents difficulty in retrieval from the tub. The permitted variability of the dimensions of flats relative to the dimensions of a USPS tub also allows smaller flats to be accommodated side-by-side which is, by definition, out of order.

Second, flats will not only have different dimensions but may be of greatly varying thicknesses and weights. Therefore, each flat will have different aerodynamic characteristics when it is placed in the tub. That is, when a flat is released from a mechanical sorting machine at some finite horizontal velocity, it will "fly" or tumble unpredictably and orientation of the flat in the tub cannot be assured. The dimensions of the tubs and the random and increasing height of a stack of flats which may be placed in the tub (as well as their possible fragility) do not permit the insertion of any mechanism into the tubs which would be effective to restrain such random tumbling effects.

Previous efforts to maintain orientation of flats has been approached by the use of specially designed tubs which were specific to a particular mechanical sorting apparatus. However, such tubs were not optimally suited to transportation of articles by the operator of the mechanical sorting machine for the multiple pass sorting processes which have been required. (U.S. Pat. No. 5,009,321 is exemplary of such sorting processes in which a first pass uses optical character recognition to apply a bar code to the article which is used in subsequent sorting passes but generally undesirable since it alters the appearance of the article and is considered defacement of the article. A second pass sorts by region or route and multiple further passes are required to place the flats in delivery order. Each pass with its corresponding insertions of flats into tubs while possibly providing for rotation of flats into a desired orientation, can result in flats being later reoriented into different, undesired, orientations.) Further, once sorting and ordering of flats has been accomplished, the flats must then be manually transferred to the USPS standard tubs for transportation and delivery. This further transfer can also be a source of errors in ordering and/or orientation since the flats can shift horizontally against each other in an uncontrollable fashion during such transfer.

In summary, while it is evident that much economy and improvement in delivery service could be obtained by accurate sorting, ordering and orientation of articles to be delivered in accordance with established and generally optimized delivery routes, and while substantial efforts have been made toward providing such sortation, efficient sorting techniques have not yet been developed that avoid the marking of articles and which minimize the number of passes necessary to achieve the desired sortation. Further, no mechanical sorting apparatus has been developed which can accommodate use of USPS standard tubs to directly receive sorted articles without compromising the ordering and/or facing (e.g. face-up and desired address orientation) of articles.

SUMMARY OF THE INVENTION

It is therefore an object of the present invention to provide a multiple-level, automated sortation process which will separate articles into groups and then further place articles in order of delivery locations along particular delivery routes for the articles.

It is another object of the invention to provide a process of sorting articles for delivery among established carrier routes and to provide ordering of the articles in the sequence of delivery drop points along each respective route.

It is a further object of the invention to provide a sortation process which delivers various articles in a common orientation as well as in order of delivery point.

It is yet another object of the invention to provide a sortation process which delivers sorted and oriented flats in standard (e.g. USPS) flats tubs.

In order to accomplish these and other objects of the invention, an article sortation method is provided comprising the steps of assigning a sequence number to each of a plurality of articles in response to an optical detection of indicia (distinctive marks) thereon, assigning a first bin to each article based on a first evaluation of the sequence number of the article, delivering each article to an assigned first bin, delivering the first bins in order assigning a second bin to each article of each first bin based on a second evaluation of the sequence number of the article to articles in each first bin in order of the first bins, delivering each article to an assigned second bin, and delivering the second bins in order.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
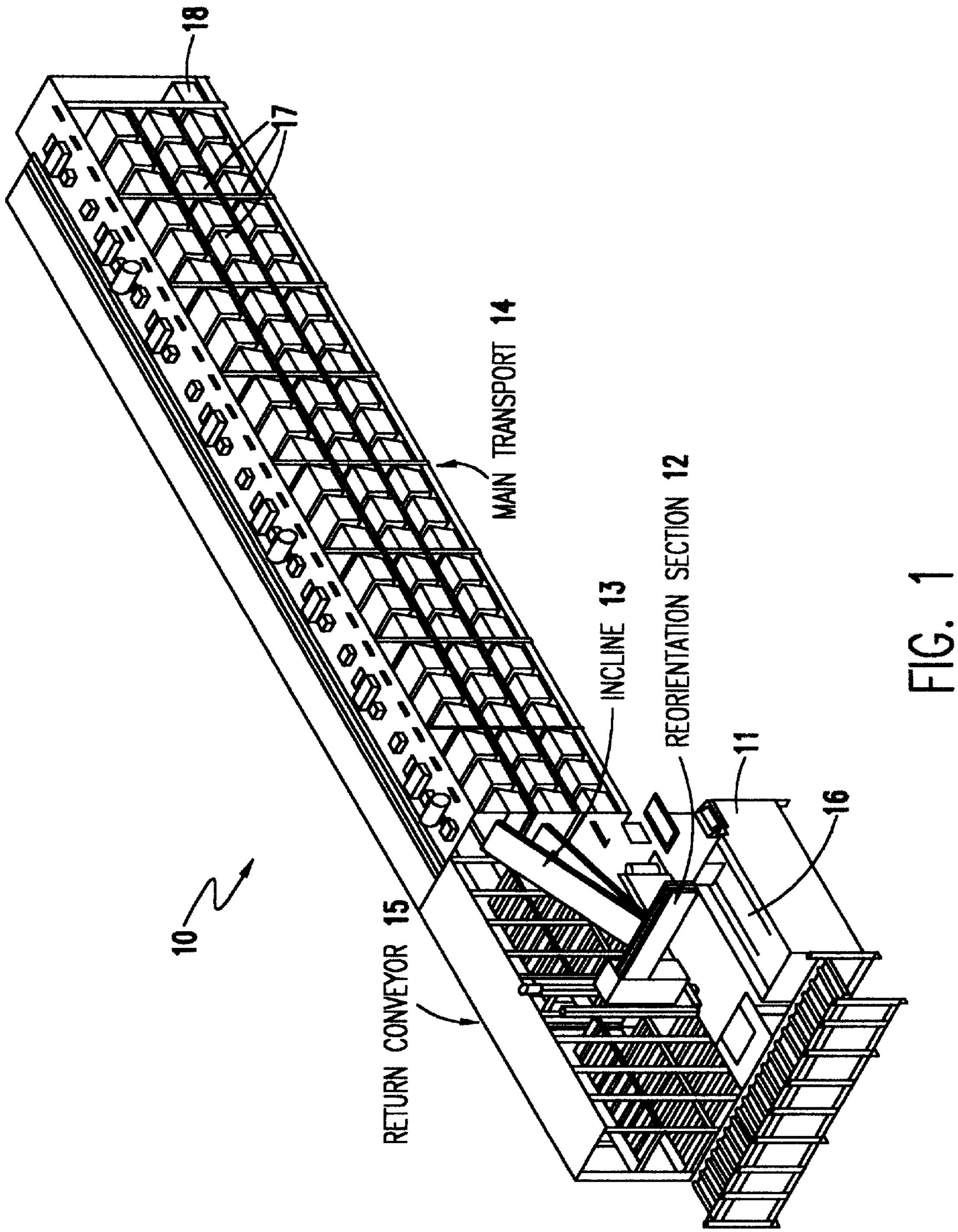
FIG. 1 is an overall view of a flat sorting apparatus with which the present invention is preferably employed.

Referring now to the drawings, and more particularly to FIG. 1, there is shown, in perspective view, a flat sorting apparatus with which the invention is preferably implemented. The apparatus illustrated in FIG. 1 has been developed by the assignee of the present invention and no portion thereof is admitted to be prior art in regard to the present invention. The apparatus illustrated in FIG. 1 has, in fact, been developed to avoid the problem of compromising order and orientation of sorted articles while placing the articles into standardized USPS tubs and to complement the present invention in regard to the limitation of sorting passes required in regard to operator convenience and operational efficiency. The details thereof are not otherwise important to the practice of the invention and will therefore be described generally.

However, it should be understood that the particular sorting apparatus which will now be described not only provides such efficiency of operation but supports the accuracy of sorting provided by the present invention to permit full realization of the benefits thereof. Nevertheless, the present invention is also capable of providing substantial improvements in sortation efficiency when implemented on other mechanical sorting apparatus even though accuracy of the sortation and orientation of articles may be compromised by alternative apparatus not having the capabilities of the apparatus of FIG. 1.

The sorting apparatus of FIG. 1 comprises five distinct mechanical sections for placing a classification of articles known as flats, alluded to above, into delivery order and a desired, address-up, orientation in standard USPS tubs. As noted above, accurate ordering of articles avoids additional sorting and grouping of the articles by the delivery route carrier and related article handling. Placing the articles in a desired facing allows the carrier to see the next delivery address along the route without any manipulation of the article; permitting delivery points to be passed over if no articles are addressed thereto. When a delivery point is reached to which an article has been addressed, the carrier need only look through the following articles in sequence in the stack within a tub until a different address is noted to make a complete delivery to the address of the uppermost article.

The five sections of the sorting apparatus 10 of FIG. 1 are a feeder 11, a reorientation section 12, an incline section 13, a main transport 14 and a return conveyor 15. The mechanical configuration of each of these sections is directed to the handling of flats and the details thereof are not critical to the practice of the invention so long as the functions which will be described below are accommodated. Suitable mechanisms to perform individual functions are known and suitable arrangements will be evident to those skilled in the art in view of the present disclosure. Likewise, the same principles, particularly in regard to the present invention, would apply to configurations adapted to the handling of letters or packages of various sizes.

Feeder 11 is the principal station of an operator who manually provides flats to the apparatus. The operator places groups of flats on the feeder load ledge 16 with the bound edge (e.g. the binding or closure flap) down and the face of the flats oriented toward the OCR/BCR (optical character recognition/bar code reader) camera. The flats will thus be presented to a pick-off head within the apparatus which will repeatedly remove the next individual flat from the stack thus presented to it. The downward orientation of the bound edge of flats is critical to the final orientation of flats in the tubs after sorting and is considered to assist in avoiding damage to the flats as they pass through the apparatus and is thus preferred. By doing so, the contact between the flat with the apparatus holds the flat closed and protects the closure flap from opening. As each flat is picked off the stack, it is accelerated to about ninety inches per second and presented to reorientation section 12.

Reorientation section 12 receives the flat in a vertical orientation and maintains its velocity past an optical character recognition (OCR) camera. The image of the flat thus obtained will include a written (e.g. human readable) address and any bar codes which may be already present on the flat (but which is not necessary to the practice of the invention) and will be in a digitized form which can be readily rotated electronically for recognition. The flat is then laid over to a horizontal orientation with the address upward and bound edge forward for presentation to the incline section 13 while the OCR or bar code reading processes are carried out to determine the eleven-digit zip code (or other destination identifier) for the initial sorting pass. The bound edge forward orientation also keeps the flat from opening as it moves forward. The velocity of the flat is also slowed to about sixty inches per second as it is passed to incline section 13.

Incline section 13 is preferably provided to allow the sorting apparatus to accommodate a potentially very large number of tubs on a plurality of levels of the main transport section 14 in a space of relatively small horizontal extent. As many levels as desired may be provided. The appropriate level of the main transport 14 is selected in accordance with the less/least significant digits or characters of the destination identifier (e.g. zip code) determined by the OCR or bar code reader and the flat is fed thereto. The incline section does not otherwise function in the sorting process and can be considered to be optional.

Each respective level of the main transport section receives flats directed to it and carries each flat to a respective drop box 17. The drop boxes are preferably about three inches deep (to accommodate flats but could be of any desired dimensions) and of horizontal dimensions generally matching those of a standard tub. The drop boxes 17 are positioned between levels of tubs held in the main transport much in the manner of shelves. Illustration of the drop boxes for the uppermost level of tubs is omitted in the interest of clarity. It is the function of the drop boxes 17 to completely stop the horizontal motion of a flat and to drop the flat, face-up, into a tub specified by the address identifier determined as discussed above. Since there is no horizontal motion of the flat, it can be dropped vertically into the tub without losing order or orientation. In this regard, the drop box is also preferably arranged to approximately center the flat over the tub (at least in one direction).

When a first pass is complete, the tubs are moved to return conveyor 15 where they are presented, in order, to the operator. Any flats which could not be sorted due to inability of the OCR/BCR to read the address written thereon are delivered to tub 18 for manual processing (advantageously at a different location from the feeder 11) and are not returned to the operator for a second pass unless provision is made for manually keying in the address. As illustrated, the return conveyor 15 preferably includes an elevator mechanism which returns the tubs 17 to a single level while maintaining their order.

As the tubs are presented to the operator, the operator is merely required to place the contents of each tub on the feed ledge 16 of feeder 11 with the desired bound edge down orientation. Flats will not need to be individually so positioned since a consistent bound edge orientation will have been achieved during the first pass. The sorting process is then repeated in precisely the same fashion as discussed above except that more significant digits or characters of the destination identifier are used to control the bin/tub into which they are placed.

Having thus described the apparatus with which the invention is preferably implemented, the sorting process of the invention will now be described with reference to FIG. 2. As will be demonstrated, the sortation process in accordance with the invention is capable of sorting and ordering all flats in only two passes although more passes could be used to limit the number of tubs required. Additional passes could also facilitate sortation with more limited hardware where mail directed to one or more geographic areas is significantly less than others and could be sorted into a small number of tubs (e.g. articles addressed to remote geographic locations for which simple separation, rather than placement in delivery order, is sufficient).

It should also be understood that the invention involves the retrieval of a stored sequence order from a database in accordance with an address or other indicia read by the OCR or bar code reader. While this can be done very rapidly with computers of relatively modest processing power, it can be understood that the size of the database can limit response time. Similarly, since some manual action is required by the operator and the number of tubs requires significant space and time to manually manipulate the contents thereof, it may be advantageous to perform a preliminary sorting process to allow several machines such as that described above to be operated in parallel.

As is well-understood in the art, the number of bins or tubs into which articles are to be sorted raised to the power of the number of passes corresponds to the number of desired points to be sorted. That is, if the sortation is to be performed in two passes a number of tubs will be required equal to the square root of the number of sorting categories (e.g. addresses or delivery points) increased to the next integral number; for three passes, the cube root of the number of categories will be required, and so on. As will be noted below, provision of one or more additional tubs to receive certain categories of articles, such as where the OCR/BCR does not recognize a destination, foreign destinations and the like. It can thus be seen that as the number of passes increases, additional processing time and operator effort (which are substantially the same for each pass) provide diminishing returns in terms of required throughput.

As the flats are processed by the feeder as described above and the address is determined by OCR or bar code reader, a tub location is determined based on a delivery sequence along the route retrieved from a database. For purposes of this discussion, it is assumed that the maximum number of delivery points to be ordered is 5184 for which the illustrated number of tubs (seventy-two) would be sufficient. These delivery points can be grouped into any number of routes having an arbitrary number of delivery points in each route up to a maximum of 5184 delivery points.

Figure 2:
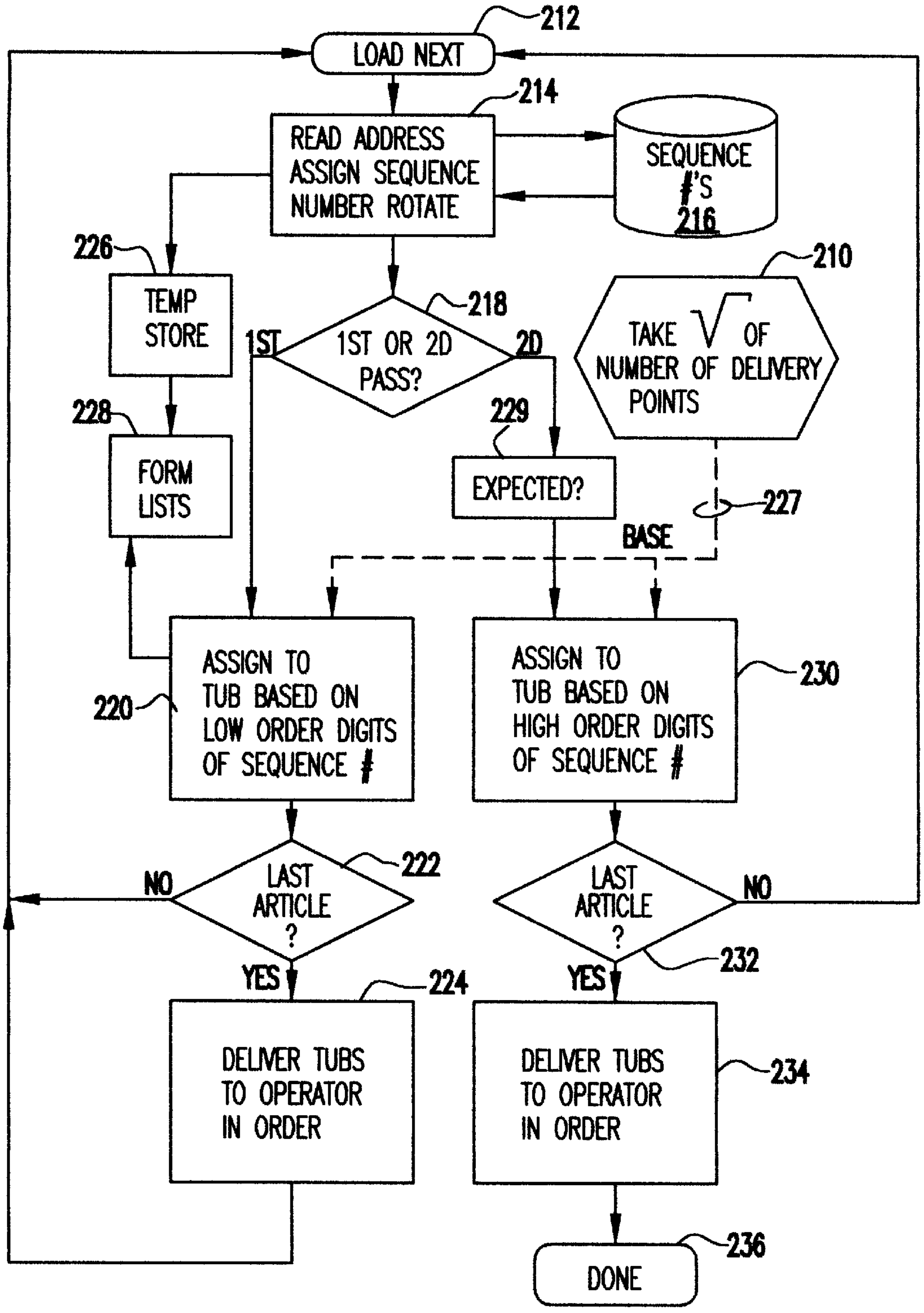
FIG. 2 is a flow diagram of the sorting process in accordance with the invention.

In general, the square root (to perform the sortation in two passes) of the maximum number of actual delivery points to be accommodated would be taken, as depicted at 210 of FIG. 2, and increased to the next integral value to form the base of the numbering system for the sorting process communicated over link 227 of FIG. 2. That is, any number of delivery points in excess of 5061 (71×71) would also require seventy-two (or more if in excess of 72×72=5186) tubs. An additional bin 18 is provided for articles which could not be automatically processed due to failure of the OCR to recognize characters in the address or excessive size of the article or other conditions as alluded to above.

The number so determined will form the base of the numbering system used for the sorting process in accordance with the invention as depicted as a preparatory operation at 210 of FIG. 2. In practice, this determination will usually be determined in developing the specifications of the apparatus of FIG. 1, described above for a given site and thereafter remain constant. However, some benefits may be gained by assigning the base in accordance with smaller numbers of delivery points (e.g. sort categories) for some sort processes, such as a re-sort for delivery points on a single route when several different sorted batches are combined for delivery at a receiving facility or consolidating delivery routes.

The operator actions described above in loading articles into feeder and the actions of the pick-off head of feeder 11 in selecting one article at a time are collectively depicted at 212 of FIG. 2. This action allows reading of addresses (and bar codes, if available) from each article with an OCR arrangement, fetching a corresponding sequence number from database 216 in accordance with the address or other information read, as depicted at 214. The number of the pass is then determined at 218 and the articles are assigned to tubs based on low order or high order digits of the sequence number in the first and second passes, respectively and the base reflecting the number of bins reflected by control signal 227. These tub assignments are separately depicted at 220 and 230, respectively. In practice, rather than branching at 218 depicted for clarity, a control signal would be set for several of the following parallel operations and the same software or hardware or a combination thereof used for both sortation passes.

While not essential to the practice of the invention, useful error checking may be done with the sequence number assigned, as will now be explained. Although the articles are unsorted and, hence, in an arbitrary order with arbitrary addresses, during a first pass, the sequence numbers, as assigned, may be placed in temporary storage 226. The articles, remaining in the same order, will be assigned to tubs, as depicted at 220. The tub assignment and the sequence number can then be merged to form a plurality of lists, depicted at 228, which exactly correspond to the articles in sequence in each tub if mechanical operations are performed correctly. These lists can then be compared with the order of articles in each tub during a second pass to determine if each article/flat is expected. If the order of presentation of articles/flats differs from a respective list, an error will have occurred and an alarm or other indication can be made to the operator and appropriate remedial action can be taken immediately or after completion of the pass.

Based upon tub assignment, the articles are conveyed to the assigned tub and deposited therein. The existence of further articles to be sorted is determined at the feeder, preferably by a combination of article sensing at the pick-off head and operator input. If articles remain to be sorted in the pass, the process loops to 212 and repeats for the next article. In practice, the loop will have been executed prior to the completion of operation 220 so that the address of the next article can be read and the sequence number fetch initiated as the sequence number is assigned and control of the mechanical sort is established for the preceding article. When all articles in a pass have been sorted, the tubs are delivered, in order, to the operator, as depicted at 224 and described above and the next second pass of the sort initiated.

As each address (or bar code) is read, the delivery point is determined and a sequence number is assigned in accordance with the base determined in the manner described in the preceding paragraph. It should be recognized that the sequence number contains information concerning both the delivery route and delivery point sequence along each route. The delivery point sequence must generally be in order and preferably reflected in the low-order digits of the sequence number. However, it is not necessary that the delivery route sequence be in any particular order, although certain simplifications of other article handling procedures may be achieved if a particular order is observed (e.g. after sortation, certain ranges of tubs in sequence may be directed to a particular vehicle or mode of transport). The delivery route sequence should preferably be reflected in higher order digits of the sequence number although some route and delivery sequence information may be shared in one or more digits of the sequence number.

The second pass is substantially identical to the first but for branching or modified control at 218 so that different sequence number criteria can be used for sorting, generally based on evaluation of higher order digits and the optional inclusion of error checking step 229. (Alternatively, steps 220 and/or 230 could include access to some translation arrangement such as a look-up table to determine a tub assignment which corresponded to any unique sequence number for a given pass, in which case the sequence number is an arbitrary designation of a destination/delivery point. Such an alternative may be useful during transition periods when delivery routes are modified or delivery points are added to existing routes.) Again, the existence of more articles to be sorted is determined at 232 with the process looping to 212 until the second pass is completed. When the second pass is completed the tubs are again presented to the operator in order. Each tub will then contain articles in delivery point order for a given delivery route or intermediate destination with the first delivery point on top and with each article oriented for optimum reading and handling by delivery personnel.

In view of the foregoing, it is seen that the invention provides for a sorting of articles presented in a random order into delivery point order for a plurality of intermediate destinations or delivery routes. The optical character or bar code reading does not require marking or defacing of the articles in any way and does not require an operation or additional pass in order to do so. Further, the OCR/BCR process allows maintaining of accurate sortation provided by the above-described process by machinery for delivering the article into tubs from a stationary position above the tubs. Operator intervention is minimal to originally present the articles to the feeder and to recirculate articles sorted by the first pass from their ordered tubs to the feeder. Thus the invention conveniently, economically and with a minimum of operator intervention provides significant convenience to delivery personnel and supports substantial increases in their productivity and efficient use of equipment.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An article sortation method comprising the steps of assigning a sequence number to each of a plurality of articles in response to an optical detection of indicia thereon, assigning a first bin to each article based on a first evaluation of the sequence number of the article, delivering each article to an assigned first bin, delivering said first bins in order, assigning a second bin to each article based on a second evaluation of the sequence number of the article to articles in each first bin, said second evaluation being performed in order of articles within each first bin and in order of the first bins, delivering each article to an assigned second bin, and delivering said second bins in order.

2. The method as recited in claim 1, wherein said second bins are standard USPS tubs.

3. The method as recited in claim 2, wherein said first bins are standard USPS tubs.

4. The method as recited in claim 1, wherein said step of assigning a sequence number is performed without further marking of said article.

5. The method as recited in claim 1, including the further step of delivering said first bins in order to an operator.

6. The method as recited in claim 1, wherein said step of delivering articles to a first bin includes the step of placing the article in a face-up orientation.

7. The method as recited in claim 1, wherein said step of delivering articles to a second bin includes the step of placing the article in a face-up orientation.

8. The method as recited in claim 1, wherein said delivery steps include the steps of dropping an article into a bin from a stationary location above the bin.

9. The method of claim 1, including the further step of forming a list of articles in each bin wherein said step of assigning a second bin includes the further steps of optically detecting indicia thereon, comparing a sequence number with a sequence number of a corresponding article in said list of articles.

10. The method of claim 1, wherein said step of assigning a second bin is based on the more significant digits of said sequence number.

11. The method of claim 10, wherein said step of assigning a first bin is based on less significant digits of said sequence number.

12. The method as recited in claim 3, wherein said step of assigning a sequence number is performed without further marking of said article.

13. The method as recited in claim 3, including the further step of delivering said first bins in order to an operator.

14. The method as recited in claim 3, wherein said step of delivering articles to a first bin includes the step of placing the article in a face-up orientation.

15. The method of claim 3, including the further step of forming a list of articles in each bin wherein said step of assigning a second bin includes the further steps of optically detecting indicia thereon, comparing a sequence number with a sequence number of a corresponding article in said list of articles.

16. The method of claim 3, wherein said step of assigning a second bin is based on least significant digits of said sequence number.

17. The method of claim 16, wherein said step of assigning a first bin is based on more significant digits of said sequence number.

18. The method as recited in claim 3, wherein said step of delivering articles to a second bin includes the step of placing the article in a face-up orientation.

19. The method as recited in claim 3, wherein said delivery steps include the steps of dropping an article into a bin from a stationary location above the bin.

20. A method as recited in claim 1 wherein said step of assigning a sequence number includes storage of said sequence number and said second evaluation includes accessing said sequence number in accordance with said step of delivering each article to an assigned first bin.

* * * * *